US012600021B2

(12) United States Patent
Petrus et al.

(10) Patent No.: US 12,600,021 B2
(45) Date of Patent: Apr. 14, 2026

(54) IMPACT POWER TOOL

(71) Applicant: BLACK & DECKER INC., New Britain, CT (US)

(72) Inventors: Tyler Petrus, Baltimore, MD (US); Robert J. Opsitos, Felton, PA (US)

(73) Assignee: BLACK & DECKER INC., New Britain, CT (US)

(*) Notice: Subject to any disclaimer, the term of this patent is extended or adjusted under 35 U.S.C. 154(b) by 0 days.

(21) Appl. No.: 18/915,983

(22) Filed: Oct. 15, 2024

(65) Prior Publication Data

US 2025/0033178 A1 Jan. 30, 2025

Related U.S. Application Data

(63) Continuation of application No. 18/533,034, filed on Dec. 7, 2023, now Pat. No. 12,138,766, which is a continuation of application No. 17/811,337, filed on Jul. 8, 2022, now Pat. No. 11,872,680.

(60) Provisional application No. 63/222,824, filed on Jul. 16, 2021.

(51) Int. Cl.

*B25D 17/00* (2006.01)
*B25B 21/02* (2006.01)
*B25D 17/06* (2006.01)
*B25F 5/00* (2006.01)
*B25F 5/02* (2006.01)

(52) U.S. Cl.

CPC ............ *B25D 17/06* (2013.01); *B25B 21/026* (2013.01); *B25F 5/001* (2013.01); *B25F 5/02* (2013.01); *B25D 2211/064* (2013.01)

(58) Field of Classification Search

CPC ................ B25B 21/026; B25D 17/016; B25D 2211/064; B25F 5/001; B25F 5/02

See application file for complete search history.

(56) References Cited

U.S. PATENT DOCUMENTS

| | | | | |
|---|---|---|---|---|
| 9,415,488 | B2 * | 8/2016 | Puzio | B25F 5/02 |
| 12,304,035 | B2 * | 5/2025 | Tomayko | B25B 21/026 |
| 2013/0192860 | A1 * | 8/2013 | Puzio | H01H 36/0073 335/219 |
| 2017/0246732 | A1 * | 8/2017 | Dey, IV | B25B 21/026 |
| 2018/0222022 | A1 * | 8/2018 | Kumagai | B25D 11/104 |
| 2019/0321958 | A1 * | 10/2019 | Cooper | B25B 21/026 |
| 2021/0023629 | A1 * | 1/2021 | Kawai | B25B 21/02 |
| 2021/0094158 | A1 * | 4/2021 | Kato | B25B 23/147 |

(Continued)

*Primary Examiner* — Eyamindae C Jallow

(74) *Attorney, Agent, or Firm* — Scott B. Markow

(57) ABSTRACT

An impact power tool includes a transmission output shaft, a rotary impact assembly with a cam shaft, hammer, and anvil, and a tool output shaft rotatable with the anvil. A coupler removably couples the cam shaft to the transmission output shaft. When torque on the tool output shaft is less than or equal to a first threshold, the transmission output shaft, cam shaft, hammer, and anvil rotate together to transmit torque to the tool output shaft. When torque on the tool output shaft is above the first threshold, the hammer moves along the cam shaft away from the anvil by a first distance and applies rotary impacts to the anvil. When the hammer moves along the cam shaft away from the anvil by a second distance greater than the first distance, the coupler decouples the transmission output shaft from the cam shaft, interrupting torque transmission to the tool output shaft.

20 Claims, 11 Drawing Sheets

(56) References Cited

U.S. PATENT DOCUMENTS

| | | | | |
|---|---|---|---|---|
| 2021/0187707 | A1* | 6/2021 | Smith | H02K 7/116 |
| 2021/0187717 | A1* | 6/2021 | McClung | B25B 21/02 |

* cited by examiner

IMPACT POWER TOOL

RELATED APPLICATIONS

This application claims priority, under 35 U.S.C. § 120, as a continuation of U.S. patent application Ser. No. 18/533,034, which is a continuation of U.S. patent application Ser. No. 17/811,337, filed Jul. 8, 2022, titled "Impact Power Tool," which claims priority under 35 U.S.C. § 119(e), to U.S. Provisional Application No. 63/222,824, filed Jul. 16, 2021, titled "Impact Tool," each of which is incorporated by reference.

TECHNICAL FIELD

This application relates to powered impact tools, such as impact drivers and impact wrenches.

BACKGROUND

Exemplary impact power tools include a housing, a motor, a transmission, and an impact assembly including a cam shaft driven by the transmission, a hammer coupled to the cam shaft for rotational and axial movement relative to the cam shaft, and an anvil engageable by the hammer. At low torque levels, the cam shaft, the hammer, and the anvil rotate together to transmit torque to the anvil without impacts. At higher torque levels, the hammer moves axially and rotationally along the cam shaft and applies intermittent rotational impacts to the anvil. At very high torque levels, the hammer may travel a greater axial distance than desired along the cam shaft and strike the transmission, which can cause failure of transmission components.

SUMMARY

In an aspect, an impact power tool includes a housing, a motor received in the housing, a transmission with a transmission output shaft received in the housing and rotationally driven by the motor. A cam ring is removably rotationally coupled to the transmission output shaft by a decoupling mechanism. The cam ring includes a cam groove that receives a cam ball. An impact mechanism includes a hammer received over the cam ring and an anvil coupled to a tool output shaft. When a low amount of torque is applied to the tool output shaft, the cam ring remains rotationally coupled to the transmission output shaft by the decoupling mechanism transmits torque to the hammer, which remains engaged with the anvil and transmits rotational motion from the transmission output shaft to the tool output shaft without any impacts. When a higher amount of torque is applied to the tool output shaft, the cam ring remains rotationally coupled to the transmission output shaft by the decoupling mechanism and transmits torque to the hammer, while the hammer travels axially along the cam ring and transmits rotary impacts to the anvil and the tool output shaft. If the impactor has a high axial displacement (e.g., past a transverse line), the decoupling mechanism will decouple from the output shaft of the transmission.

Implementations of this aspect may include one or more of the following features. The decoupling mechanism may include retaining balls that are removably retained in grooves in the transmission output shaft. The hammer may include a bore having a first inner diameter portion and a second inner diameter portion having a greater diameter than the first inner diameter portion. At the low torque and higher torque levels, the first inner diameter portion may keep the retaining balls engaged with the recesses. At the very high torque levels, the second inner diameter portion may allow the balls to move radially out of the recesses to decouple the transmission output shaft from the cam ring.

The decoupling mechanism may include a coupling ring configured to releasably couple the transmission output shaft to the cam ring. The coupling ring may include splines configured to engage splines on the cam ring. The coupling ring may move between a first position in which the splines on the coupling ring engage the splines on the cam ring to transmit torque from the transmission output shaft to the cam ring and a second position in which the splines on the coupling ring are disengaged from the splines on the cam ring to interrupt torque transmission from the transmission output shaft to the cam ring. The coupling ring may be biased toward the first position by a spring or elastic member.

The decoupling mechanism may include a coupler coupled for rotation to the transmission to the output shaft and releasably coupled to the cam ring. The coupler may include a clutch ring coupled to the transmission output shaft and a plurality of clutch balls releasably engaging recesses in the cam ring. The coupler may move between a first position in which the coupler engages the cam ring to transmit torque from the transmission output shaft to the cam ring and a second position in which the coupler is disengaged from the cam ring to interrupt torque transmission from the transmission output shaft to the cam ring. The coupler may be biased toward the first position by a spring or elastic member.

In another aspect, an impact power tool includes a housing, a motor disposed in the housing and including a motor output shaft, a transmission including a transmission output shaft and an input member rotatably drivable by rotation of the motor output shaft, a rotary impact assembly including a cam shaft extending along and rotatable about an axis, a hammer coupled to the cam shaft for axial and rotational movement relative to the cam shaft, an anvil rotatable about the axis, and a spring biasing the hammer toward the anvil, a tool output shaft at least partially received in the housing and rotatable by rotation of the anvil, and a coupler removably coupling the cam shaft to the transmission output shaft. When torque on the tool output shaft is less than or equal to a first threshold, the transmission output shaft, the cam shaft, the hammer, and the anvil rotate together to transmit torque to the tool output shaft. When torque on the tool output shaft is above the first threshold, the hammer moves along the cam shaft away from the anvil by at least a first distance and applies intermittent rotary impacts to the anvil and the tool output shaft. When the hammer moves along the cam shaft away from the anvil by at least a second distance greater than the first distance, the coupler decouples the transmission output shaft from the cam shaft, interrupting torque transmission to the tool output shaft.

Implementations of this aspect may include one or more of the following features. The cam shaft may comprise a cam ring received at least partially over the transmission output shaft. The hammer may include a portion that is configured to cause the coupler to move from a coupled position to a decoupled position when the hammer moves along the anvil by at least the second distance. The coupler may include a ball movable between the coupled position where the ball is received in a recess in at least one of the transmission output shaft or the cam shaft to non-rotatably couple the transmission output shaft to the cam shaft, and the decoupled position where the ball is movable out of the recess to decouple the transmission output shaft from the cam shaft.

The hammer may include a bore having a first diameter portion that maintains the ball in the recess when the hammer moves along the cam shaft by less than the second distance, and a second larger diameter portion that allows the coupler ball to move out of the recess when the hammer moves along the cam shaft by at least the second distance. The coupler may comprise a coupler ring movable between the coupled position in which the coupler ring non-rotatably couples the transmission output shaft to the cam shaft, and the decoupled position in which the coupler ring disengages from at least one of the transmission output shaft or the cam shaft to decouple the transmission output shaft from the cam shaft. The hammer may include a rearward protrusion that pushes the coupler ring toward the decoupled position when the hammer moves along the cam shaft by at least the second distance. The coupler may comprise a clutch ring non-rotatably coupled to one of the transmission output shaft or the cam shaft and a clutch ball engaged by the clutch ring and receivable in a recess in the other of the transmission output shaft or the cam shaft, the clutch ring being movable between a first position where the clutch ball is engaged with the recess to non-rotatably coupled the transmission output shaft to the cam shaft, and a second position in which the clutch ball is disengageable from the recess to decouple the transmission output shaft from the cam shaft. The hammer may include a portion that is configured to push the clutch ring toward the second position when the hammer moves axially along the cam shaft by greater at least the second distance.

In another aspect, an impact power tool includes a housing, a motor disposed in the housing and having a motor output shaft, a transmission having an input member rotatably drivable by rotation of the motor output shaft and a transmission output shaft, a rotary impact assembly including a cam shaft removably coupled to the transmission output shaft, a hammer coupled to the cam shaft and able to move axially and rotatably relative to the cam shaft, an anvil rotatable about the axis; and a spring biasing the hammer toward the anvil, a tool output shaft at least partially received in the housing and rotatable by rotation of the anvil, and a coupler removably coupling the cam shaft to the transmission output shaft, When torque on the tool output shaft is at or below a first threshold, the transmission output shaft, the cam shaft, the hammer, and the anvil rotate together to transmit torque to the tool output shaft without impacts. When torque on the tool output shaft is above the first threshold, and the hammer moves axially and rotationally along the cam shaft toward and away from the anvil to apply intermittent rotary impacts to the anvil and the tool output shaft. When torque on the tool output shaft is above a second threshold greater than the first threshold, the coupler decouples the transmission output shaft from the cam shaft, interrupting torque transmission to the tool output shaft.

Implementations of this aspect may include one or more of the following features. The cam shaft may comprise a cam ring received at least partially over the transmission output shaft. When torque above the first threshold is applied to the tool output shaft, the hammer may move along the cam shaft away from the anvil by at least a first distance, and when torque about the second threshold is applied to the tool output shaft, the hammer may move along the cam shaft away from the anvil by at least a second distance greater than the first distance to enable the coupler to decouple the transmission output shaft from the cam shaft. The coupler may include a coupler ball movable between a first position where the ball is received in a recess in at least one of the transmission output shaft or the cam shaft to non-rotatably couple the transmission output shaft to the cam shaft, and a second position where the ball moves out of the recess to decouple the transmission output shaft from the cam shaft. The hammer may include a first portion that maintains the coupler ball in the recess when torque applied to the output shaft is less than or equal to the second threshold, and a second portion that allows the coupler ball to move out of the recess when torque applied to the output shaft is greater than the second threshold. The coupler may comprise a coupler ring movable between a first position in which the coupler ring non-rotatably couples the transmission output shaft to the cam shaft, and a second position in which the coupler ring disengages from at least one of the transmission output shaft or the cam shaft to decouple the transmission output shaft from the cam shaft. The hammer may have a portion that moves the coupler ring toward the second position when torque applied to the output shaft is greater than the second threshold. The coupler may comprise a clutch ring non-rotatably coupled to one of the transmission output shaft or the cam shaft and a clutch ball receivable in a recess the other of the transmission output shaft or the cam shaft, the clutch ring being movable between a first position where the clutch ball is engaged with the recess to non-rotatably coupled the transmission output shaft to the cam shaft, and a second position in which the clutch ball is disengageable from the recess to decouple the transmission output shaft from the cam shaft. The hammer may have a portion that moves the clutch ring toward the second position when the torque applied to the output shaft is greater than the second threshold.

In another aspect, an impact power tool includes a housing, a motor disposed in the housing and having a motor output shaft, a transmission having an input member rotatably drivable by rotation of the motor output shaft and a transmission output shaft, a rotary impact assembly including a cam shaft received at least partially over the transmission output shaft, a hammer coupled to the cam shaft and able to move axially and rotatably relative to the cam shaft, an anvil rotatable about the axis, and a spring biasing the hammer toward the anvil, a tool output shaft at least partially received in the housing and rotatable by rotation of the anvil, and a coupler removably coupling the cam shaft to the transmission output shaft. When torque on the tool output shaft is at or below a first threshold, the coupler non-rotatably couples the transmission output shaft to the cam shaft and the hammer continuously engages the anvil so that the transmission shaft, the cam shaft, the hammer and the anvil rotate together to transmit torque to the tool output shaft without impacts. When torque on the tool output shaft is above the first threshold, the coupler non-rotatably couples the transmission output shaft to the cam shaft and the hammer moves along the cam shaft away from the anvil at least a first distance and applies intermittent rotary impacts to the anvil and the tool output shaft. When torque above a second threshold greater than the first threshold is applied to the output shaft, the hammer moves along the cam shaft away from the anvil by at least a second distance that is greater than the first distance and causes the coupler to decouple the transmission output shaft from the cam shaft, interrupting torque transmission to the tool output shaft. In an implementation of this aspect, the coupler may be moveable between a coupled position where the coupler non-rotatably couples the transmission output shaft to the cam shaft, and a decoupled position where the coupler rotationally decouples the transmission output shaft from the cam shaft, and the hammer has a feature that forces the coupler toward the decoupled position when the hammer moves along the cam shaft by at least the second distance.

Advantages may include one or more of the following. The coupler may enable interrupting transmission of torque from the transmission output shaft to cam shaft and the tool output shaft when the hammer moves axially toward the transmission by greater than a threshold distance or when torque on the output shaft exceeds a threshold torque value. This may help inhibit the hammer from moving too far rearward, where it may strike and damage the transmission. These and other advantages and features will be apparent from the description, the drawings, and the claims.

DETAILED DESCRIPTION

Figure 1:
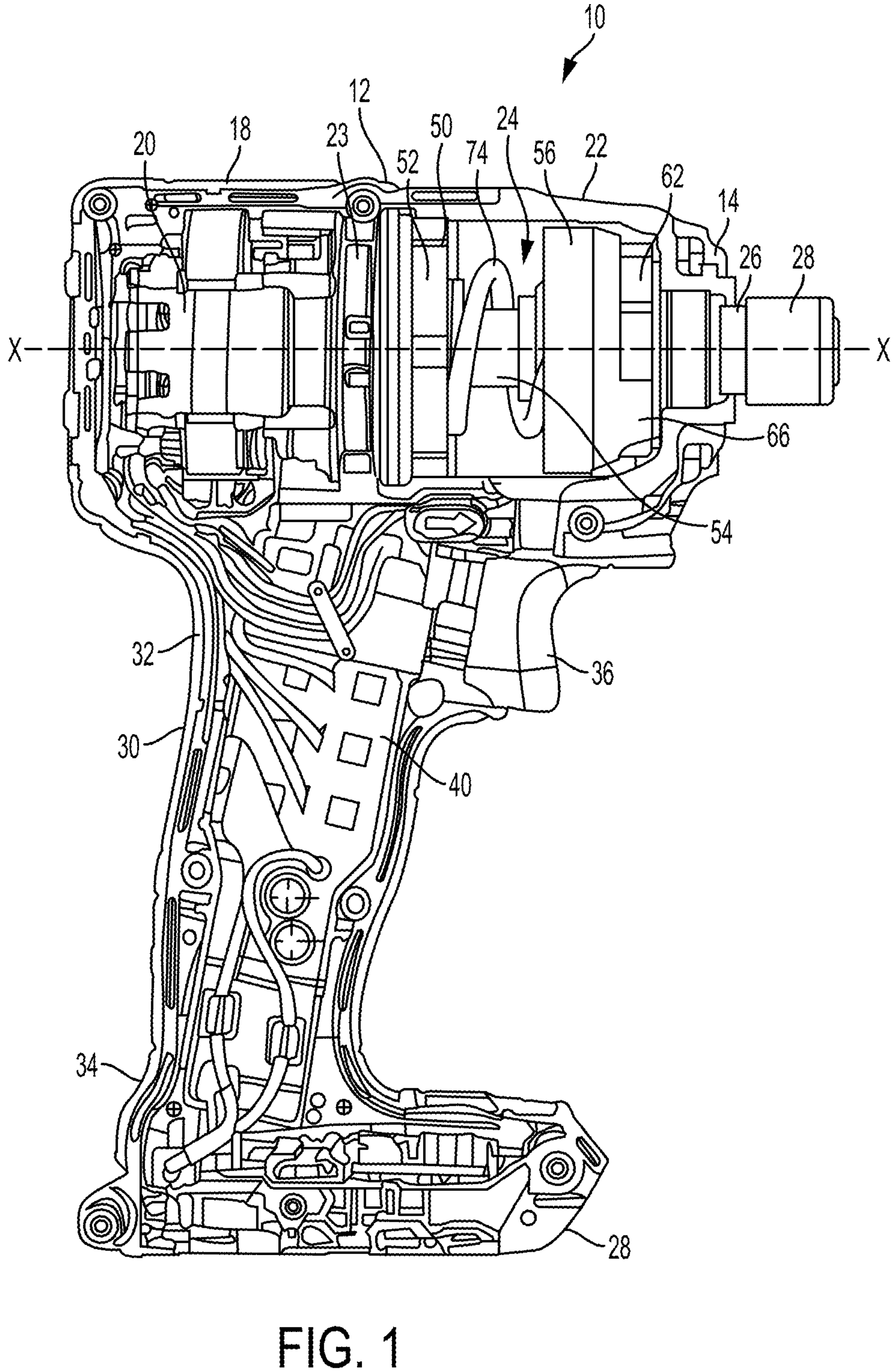
FIG. 1 is a side cross-sectional view of an implementation of an impact power tool.
Figure 2:
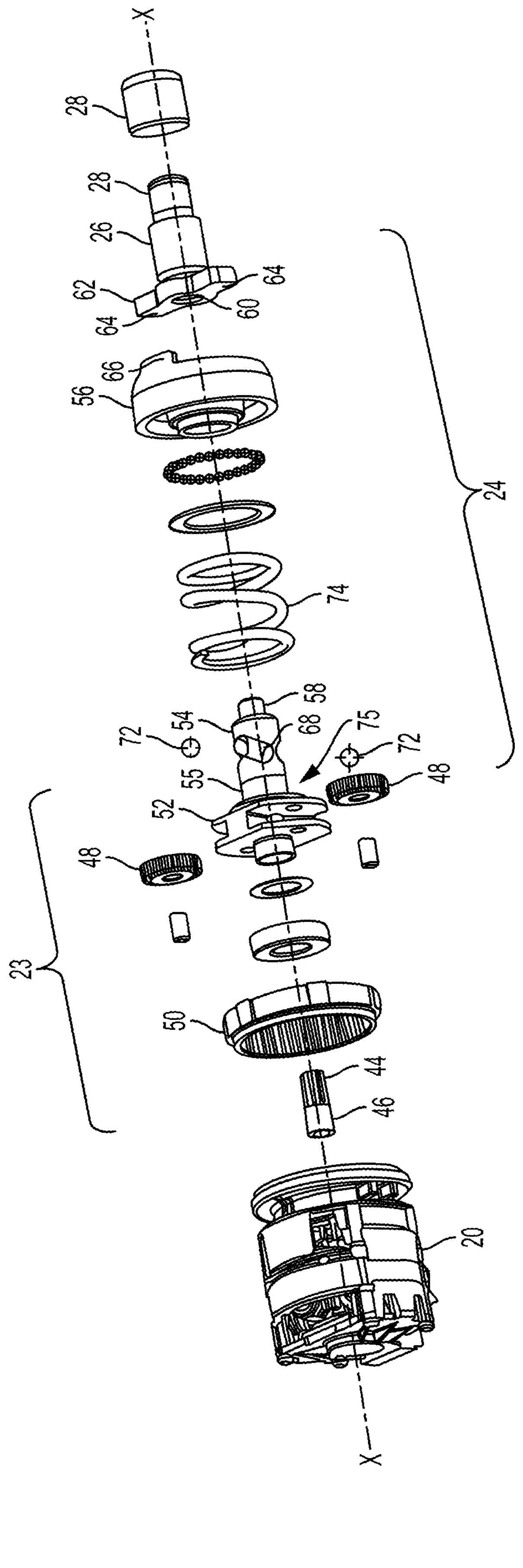
FIG. 2 is an exploded perspective view of a motor, transmission, coupler, and impact assembly of the impact power tool of FIG. 1.
Figure 3:
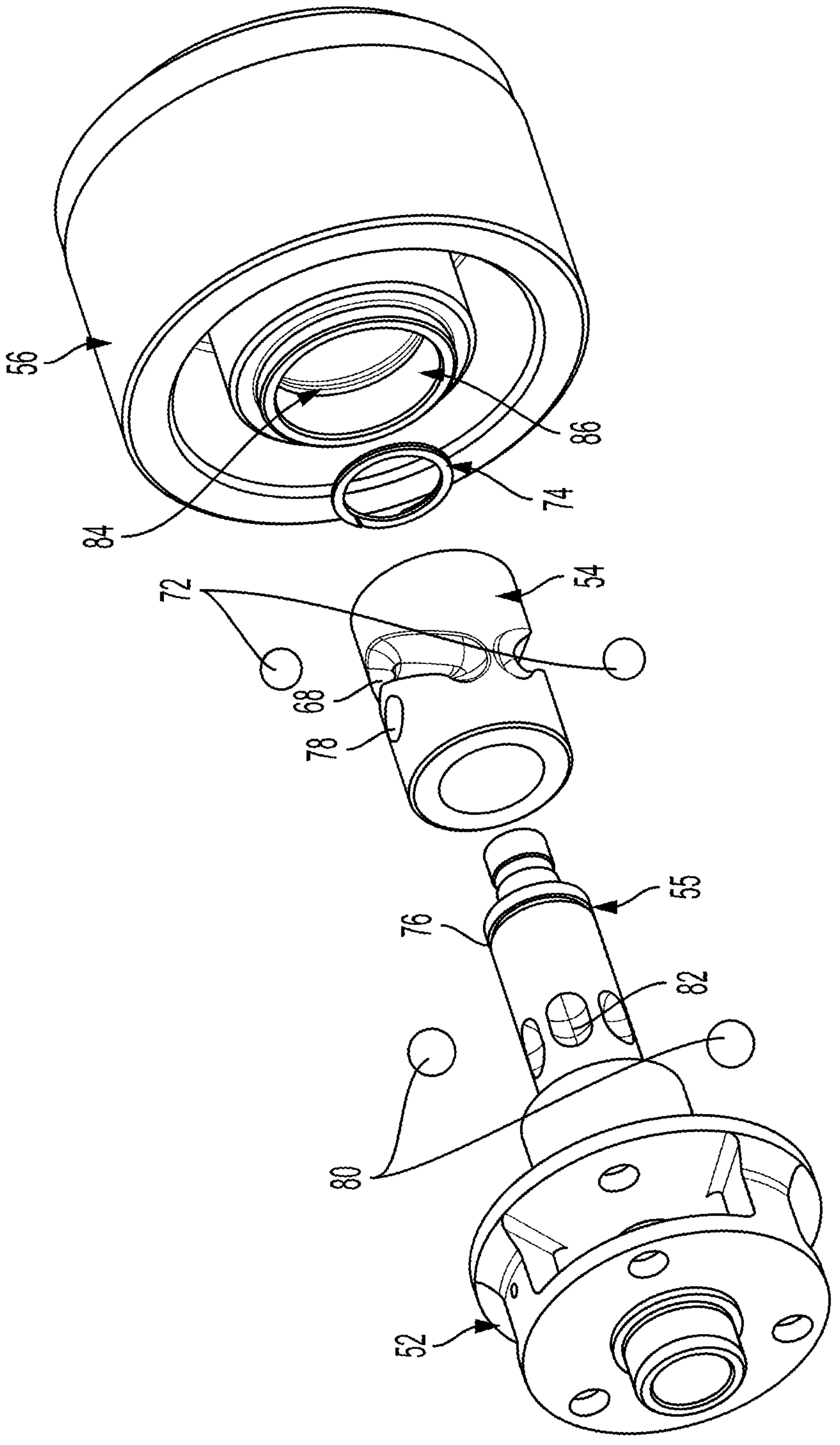
FIG. 3 is an exploded perspective view of a portion of the transmission, coupler, and impact assembly of the power tool of FIG. 1.

Referring to FIGS. 1-2, in an implementation, an impact power tool 10 includes a housing 12 (including a motor housing portion 18 and an impact housing portion 22) extending generally along a tool axis X, a motor 20 with a motor output shaft 46 received in the housing 12, a transmission 23 received in the housing 12 and configured to be rotationally driven by the motor 20, a rotary impact assembly 24 received in the housing and coupled to the transmission 23, a tool output shaft 26 at least partially received in the housing 12 and extending from a front end 14 of the housing 12, and a tool bit holder 28 coupled to a front end of the tool output shaft 26. The impact power tool also includes a handle 30 with a top end portion 32 coupled to the housing 12 and a bottom end portion 34 coupled to a receptacle 28 for receiving a battery or other power supply (not shown), and a trigger switch 36 coupled to a control circuit 40 for controlling power delivery from the power supply to the motor 20.

The transmission 23 includes a pinion or sun gear 44 rotated by a motor output shaft 46, a plurality of planet gears 48 pivotally mounted to a rotatable carrier 52 and meshed with the pinion gear 44, a stationary ring gear 50 that surrounds and is meshed with the planet gears 48, and a transmission output shaft 55 extending along the tool. When the motor shaft 46 rotates about the axis X, the pinion gear 44 rotates, causing the planet gears 48 to rotate and revolve around the pinion gear 44, in turn causing the carrier 52 and the transmission output shaft 55 to rotate about a tool output axis X.

The impact assembly 24 includes a cam shaft 54 extending along the axis X and selectively coupled for rotation to the transmission output shaft 55 by a coupler 75, as described in more detail below. Received over the cam shaft 54 is a generally cylindrical hammer 56 that is configured to move rotationally and axially relative to the cam shaft 54. The cam shaft 54 also has a front end 58 of smaller diameter that is rotatably received in an axial opening 60 in the tool output shaft 26. Fixedly coupled to a rear end of the tool output shaft 26 is an anvil 62 having two radial projections 64. The hammer 56 has two hammer projections 66 on its front end that lie in the same rotational plane as the radial projections 64 of the anvil 62 so that each hammer projection 66 may engage a corresponding anvil projection 64 in a rotating direction.

Formed on an outer wall of the cam shaft 54 is a pair of rear-facing V-shaped cam grooves 68 with their open ends facing toward the rear end portion 16 of the housing 12. A corresponding pair of forward-facing V-shaped cam grooves (not shown) is formed on an interior wall of the hammer 56 with their open ends facing toward the front end portion 14 of the housing 12. A cam ball 72 is received in and rides along each of the cam grooves 68, 70 to couple the hammer 56 to the cam shaft 54. A compression spring 74 is received in a cylindrical recess 76 in the hammer 56 and abuts a forward face of the planet carrier 52. The spring 74 biases the hammer 56 toward the anvil 62 so that the so hammer projections 66 engage the corresponding anvil projections 64.

At low torque levels (e.g., less than a first threshold), the impact mechanism 24 transmits torque to the output spindle 28 in a rotary mode. In the rotary mode, the compression spring 74 maintains the hammer 56 in its most forward position so that the hammer projections 66 engage the anvil projections 64. This causes the cam shaft 54, the hammer 56, the anvil 62 and the output spindle to rotate together as a unit about the tool axis X so that the output spindle 26 has substantially the same rotational speed as the cam shaft 54.

As the torque increases to exceed the first threshold (a torque transition threshold), the impact mechanism 24 transmits torque to the output spindle 28 in an impact mode. In the impact mode, the hammer 56 moves axially rearwardly against the force of the spring 74. This decouples the hammer projections 66 from the anvil projections 64. Thus, the anvil 62 continues to spin freely on its axis without being driven by the motor 20 and transmission 23, so that it coasts to a slightly slower speed. Meanwhile, the hammer 56 continues to be driven at a higher speed by the motor 20 and transmission 23. As this occurs, the hammer 56 moves axially rearwardly relative to the anvil 62 by the movement of the balls 72 rearwardly in the V-shaped cam grooves 68. When the balls 72 reach their rearmost position in the V-shaped cam grooves 68, 70 the spring 74 drives the hammer 56 axially forward with a rotational speed that exceeds the rotational speed of the anvil 62. This causes the hammer projections 66 to rotationally strike the anvil projections 64, imparting a rotational impact to the output spindle 26. This impacting operation repeats as long as the torque on the output spindle 26 continues to exceed the torque transition threshold.

At very high torque (e.g., above a second threshold that is greater than the first threshold) the hammer 56 may move axially rearward further than desired, which if allowed may cause the rear end of the hammer 56 to strike the planet carrier 52, causing damage to the planet carrier 52 and/or other transmission components. The coupler 75 alleviates this problem by decoupling the transmission output shaft from the cam ring at very high axial displacement of the hammer along the transmission output shaft, interrupting torque transmission from the transmission output shaft to the cam shaft, which also interrupts torque transmission to the hammer.

Referring also to FIGS. 3-6B, the cam shaft 54 may be in the form of a cam ring 54 received over a portion of the transmission output shaft 55. The cam ring 54 includes the V-shaped cam grooves 68 with the cam balls 72 traveling in the cam grooves 68 as the hammer 56 moves axially and rotationally relative to the cam shaft 54. The cam shaft 54 is axially retained on the transmission output shaft 55 by a snap-ring 74 at the front end of the cam shaft 54. The snap-ring 74 is received in an annular groove 76 in the transmission output shaft 55. The cam shaft 54 is selectively able to rotate relative to the transmission output shaft 55.

The coupler 75 includes a plurality of coupler balls 80 received in radial bores 81 in the cam shaft 54 and removably receivable in a plurality of radial recesses 82 in the transmission output shaft 55. The coupler 75 further includes an axial bore 84 in the hammer 54 that receives the transmission output shaft 55 and the cam shaft 54. The axial bore 84 is defined by an outer wall 86 having a rear portion 86A with a first diameter D1 and a front portion 86B with a second diameter D2 that is greater than the first diameter D1. When the rear portion 86A of the bore 84 is aligned with the coupler balls 80, the outer wall 86 maintains the balls 80 radially in the radial recesses 82, so that the transmission output shaft 55 is non-rotatably coupled to the cam shaft 54 to enable torque transmission between them. When the front portion 86B of the bore 84 is aligned with the coupler balls 80, the outer wall 86 has a clearance that allows the balls 80 to move radially outward from the radial recesses 82, rotationally decoupling the transmission output shaft 55 from the cam shaft 54 and interrupting torque transmission between them.

Figure 4B:
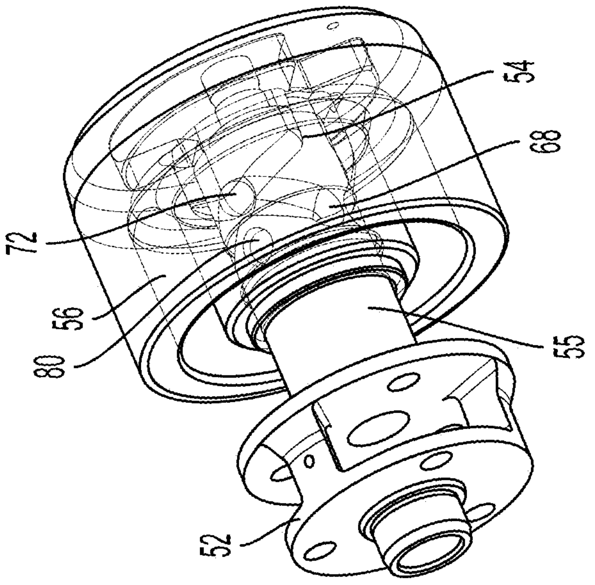
FIG. 4B is a partially transparent perspective view of the transmission, coupler, and impact assembly of FIG. 4A with the hammer in the first position.
Figure 4A:
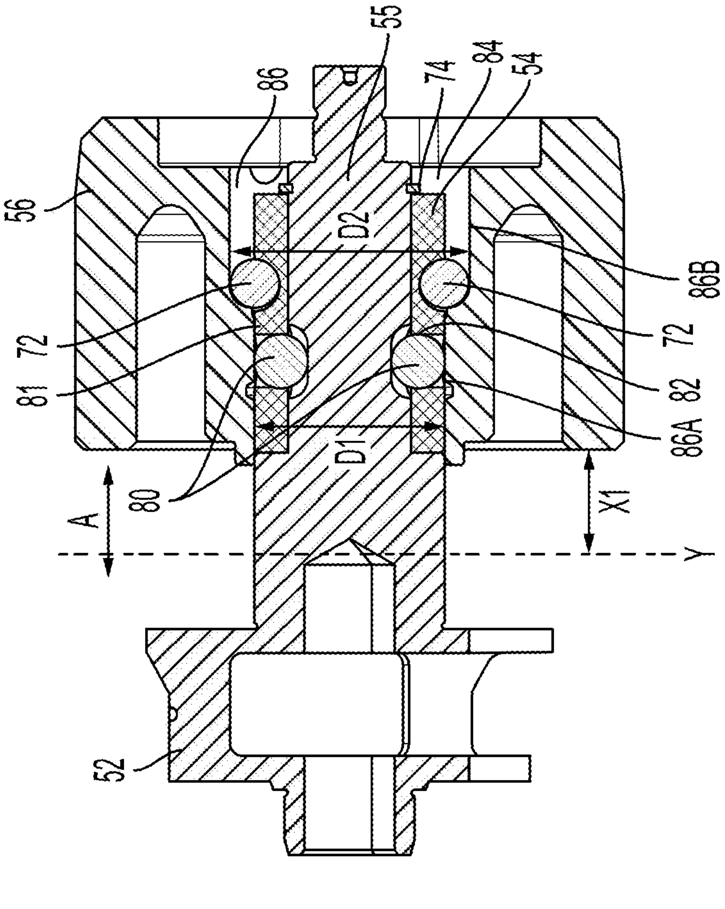
FIG. 4A is a side-cross sectional view of the transmission, coupler, and impact assembly of FIG. 3 with the hammer in a first position.

As shown in FIGS. 4A-4B, in operation, when torque on the tool output shaft 26 is less than the first threshold, the hammer 56 generally remains in a forward position (as shown in FIG. 4A) with the hammer projections 66 continuously engaged with the anvil projections 64. At the same time, the rear portion 86A of the outer wall 86 of the axial bore 84 in the hammer axially are continuously aligned with the detent coupler balls 80. The smaller diameter D1 of the rear portion 86A forces the detent coupler balls 80 radially inward so that they are continuously retained in the recesses 82 in the transmission output shaft 55 and the balls 80 non-rotatably couple the transmission output shaft 55 and the cam shaft 54. This causes the transmission output shaft 55, the cam shaft 54, the hammer 56, and the anvil 60 to rotate continuously together to transmit torque to the tool output shaft 26 without impacts.

Figure 5B:
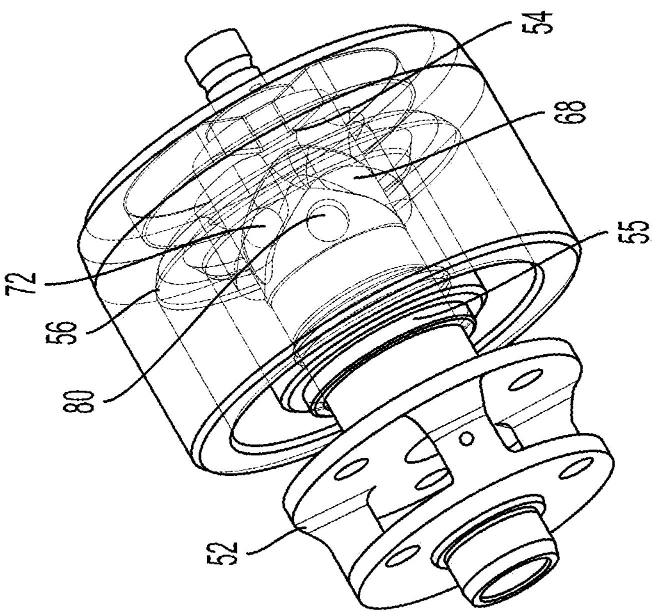
FIG. 5B is a partially transparent perspective view of the transmission, coupler, and impact assembly of FIG. 5A with the hammer in the second position.
Figure 5A:
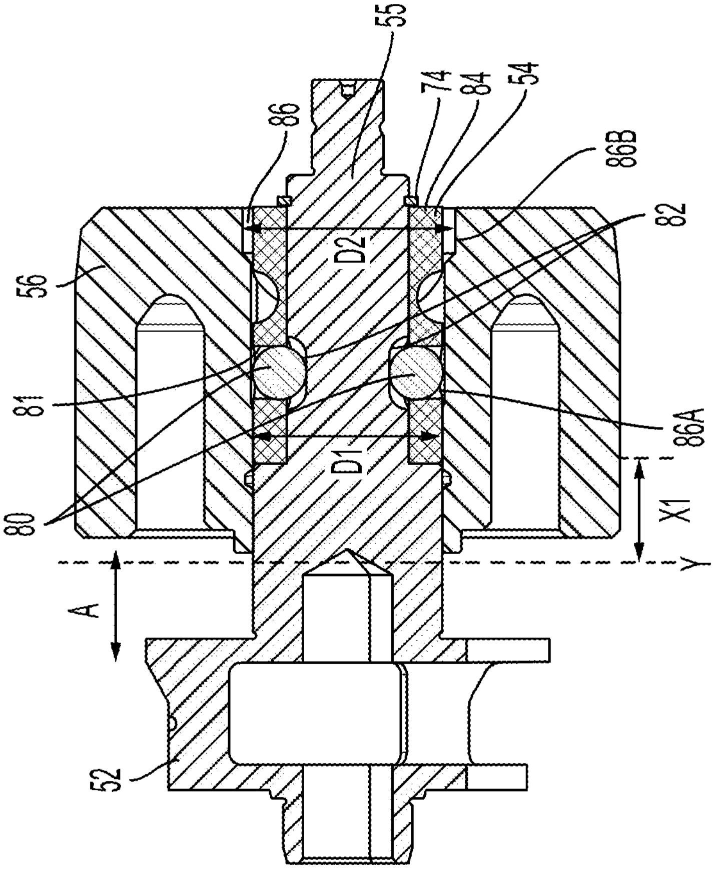
FIG. 5A is a side-cross sectional view of the transmission, coupler, and impact assembly of FIG. 3 with the hammer in a second position.

As also shown in FIGS. 5A-5B, when torque on the tool output shaft 26 is above the first threshold, the hammer 56 moves radially and axially along the cam shaft 54 and transmission output shaft 55 away from the anvil by a first distance X1 up to at most line Y. Over the entirety of this travel distance X1, the smaller diameter D1 of the rear portion 86A forces the detent coupler balls 80 radially inward so that they are continuously retained in the recesses 82 in the transmission output shaft 55 and the balls 80 non-rotatably couple the transmission output shaft 55 and the cam shaft 54. At the same time, the cam balls 72 travel in the cam groove 68 so that the hammer 56 applies intermittent rotary impacts to the anvil 60 and to the tool output shaft 26.

Figure 6B:
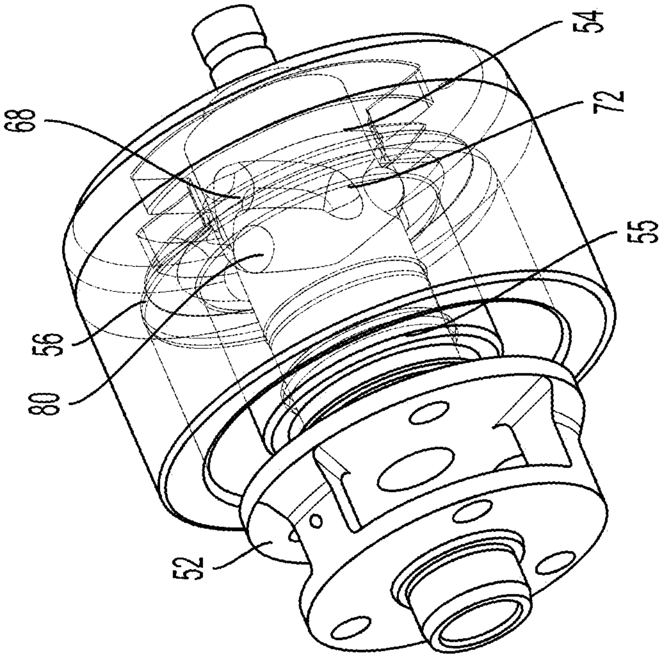
FIG. 6B is a partially transparent perspective view of the transmission, coupler, and impact assembly of FIG. 6A with the hammer in the third position.
Figure 6A:
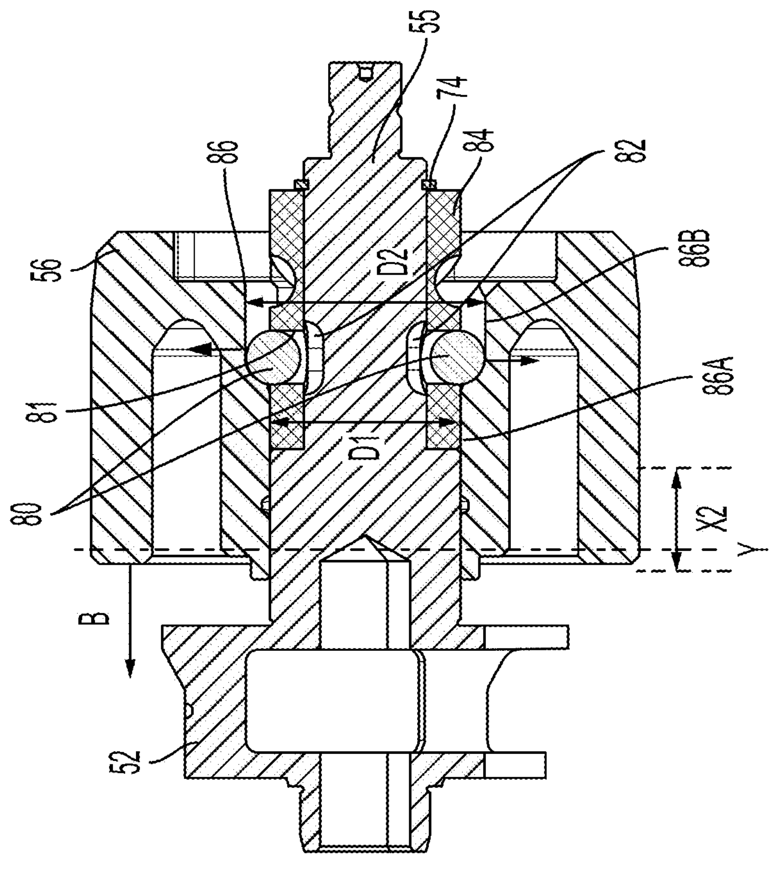
FIG. 6A is a side-cross sectional view of the transmission, coupler, and impact assembly of FIG. 3 with the hammer in a third position.

As also shown in FIGS. 6A-6BB, when torque on the tool output shaft 26 is above the second threshold (which is greater than the first threshold), the hammer 56 moves radially and axially along the cam shaft 54 and the transmission output shaft 55 away from the anvil by a second distance X2 that is greater than the first distance X1, and that is past line Y. In this position, the front portion 86B of the outer wall 86 of the axial bore 84 in the hammer 56 is axially aligned with the detent coupler balls 80. The larger diameter D2 of the front portion 86B of the outer wall 86 creates space that allows the detent coupler balls 80 to move radially outward from the recesses 82 in the transmission output shaft 55. When the balls 80 move out of the recesses 82, the transmission output shaft 55 and the cam shaft 54 are rotationally decoupled and torque transmission from the transmission output shaft 55 to the cam shaft 54 is interrupted. This also interrupts torque transmission to the hammer 56, the anvil 60 and the tool output shaft 26. Interrupting torque transmission helps prevent the hammer 56 from moving further rearward and striking the planet carrier 52.

FIGS. 7A-7D illustrate another implementation of a rotary impact power tool 110 including a housing, a motor, a transmission 123, rotary impact assembly 124, and tool output shaft substantially similar to the housing 12, motor 20, transmission 23, impact assembly 24, and a tool output shaft 26 of the rotary impact power tool 10 described above, except for the differences discussed below. The transmission 123 includes a planet carrier 152 that carries planet gears (not shown) and a transmission output shaft 155 fixed to the planet carrier 152 so that they rotate together about the axis X upon rotation of the motor. The rotary impact assembly 124 includes a cam shaft 154 in the form of a cam ring received at least partially over the transmission output shaft

155 and axially retained on the transmission output shaft 155 by a snap-ring 172 received in an annular groove in the front end of the cam shaft 154. The impact assembly 124 further includes a generally cylindrical hammer 156 received over the cam shaft 154 and configured to move rotationally and axially relative to the cam shaft 154 to apply rotational impacts to the anvil (not shown). The impact assembly 124 also includes a pair of rear-facing V-shaped cam grooves 168 in the cam shaft 154, a corresponding pair of forward-facing V-shaped cam grooves (not shown) formed on an interior wall of the hammer 156, and a cam ball 172 received in and riding along the cam grooves 168, 170 to couple the hammer 156 to the cam shaft 154.

The transmission output shaft 155 and the cam shaft 154 are removably coupled to one another for common rotation by a coupler 175. The coupler 175 includes a coupling ring 180 with at least one internal spline or projection 182 received in at least one corresponding external spline or recess 184 in the transmission output shaft 155 and in at least one corresponding external spline or recess 186 in the cam shaft 154. The coupling ring 180 is movable axially between a forward position (shown in FIG. 7C) and a rearward position (shown in FIG. 7D) and is biased toward the forward position by a spring 188 that is disposed rearward of the coupling ring 180. The hammer 156 includes a rearward projection 190 that is configured to push the coupling ring 180 toward the rearward position when the hammer 156 moves axially rearward along the cam shaft 154 (as shown in FIG. 7D).

In the forward position (FIGS. 7A and 7C), the spline or projection 182 on the coupler ring 180 engages both the external spline or recess 184 in the transmission output shaft 155 and the external spline or recess 186 in the cam shaft 154 so that torque is transmitted from the transmission output shaft 155 to the cam shaft 154. In the rearward position (FIG. 7D), the spline or projection 182 engages only the spline or recess 184 in the transmission output shaft 155 but not the spline or recess 186 in the cam shaft, 154, which rotationally decouples the transmission output shaft 155 from the cam shaft 154 interrupts torque transmission from the transmission output shaft 155 to the cam shaft 154.

Figure 7B:
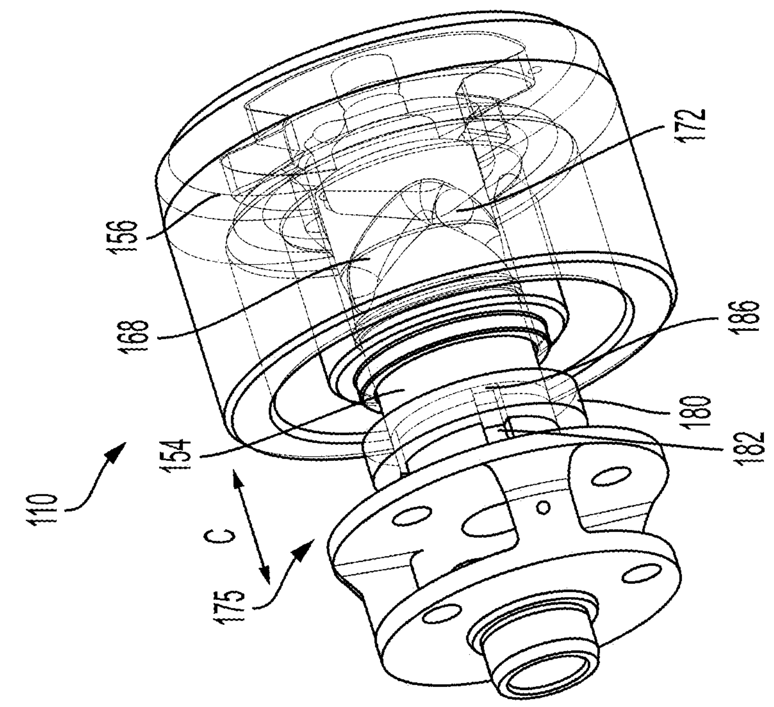
FIG. 7B is a partially transparent perspective view of the transmission, coupler, and impact assembly of FIG. 7A with the hammer in the first position.
Figure 7A:
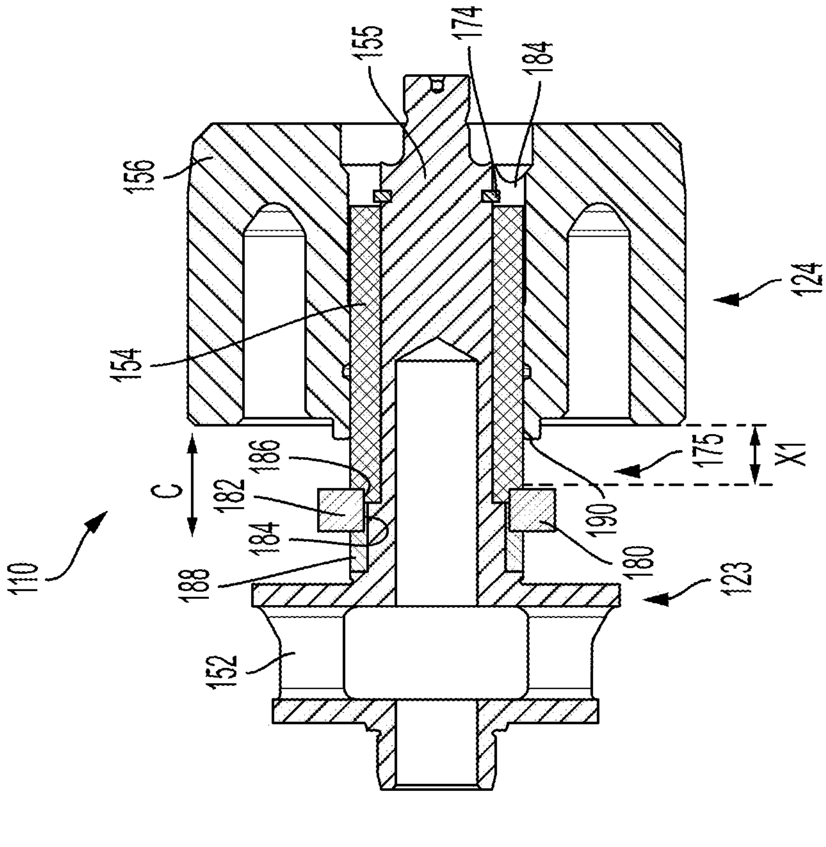
FIG. 7A is a side-cross sectional view of another implementation of a transmission, coupler, and impact assembly of an impact power tool, with the hammer in a first position.
Figure 7D:
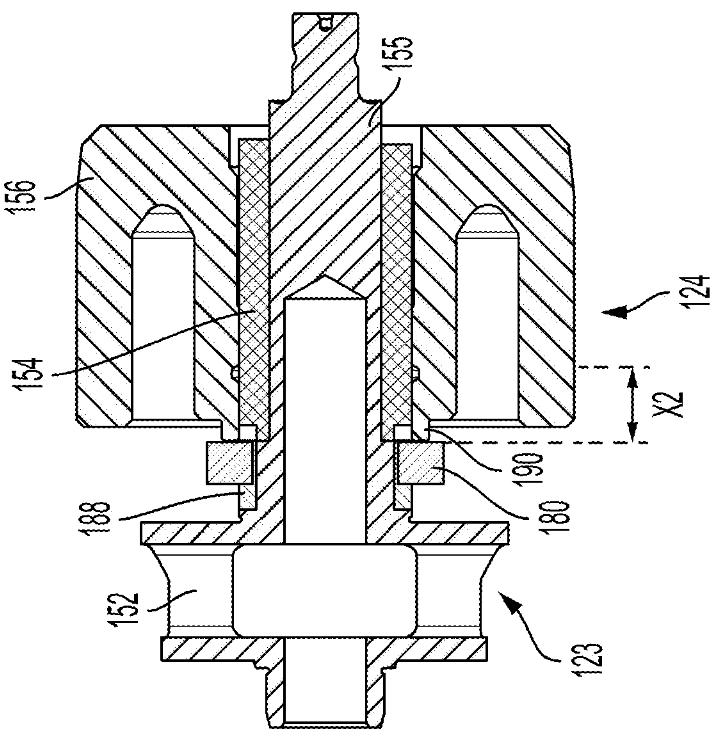
FIG. 7D is a side-cross sectional view of the transmission, coupler, and impact assembly of FIG. 7A with the hammer in a second position.

In operation, when torque on the tool output shaft is less than a first threshold, the hammer 156 generally remains in a forward position (as shown in FIG. 7A) with the hammer projections continuously engaged with the anvil projections. At the same time, the coupler ring 180 engages both the external spline or recess 184 in the transmission output shaft 155 and the external spline or recess 186 in the cam shaft 154 so that torque is transmitted from the transmission output shaft 155 to the cam shaft 154. This causes the transmission output shaft 155, the cam shaft 154, the hammer 156, and the anvil to rotate continuously together to transmit torque to the tool output shaft without impacts.

Figure 7C:
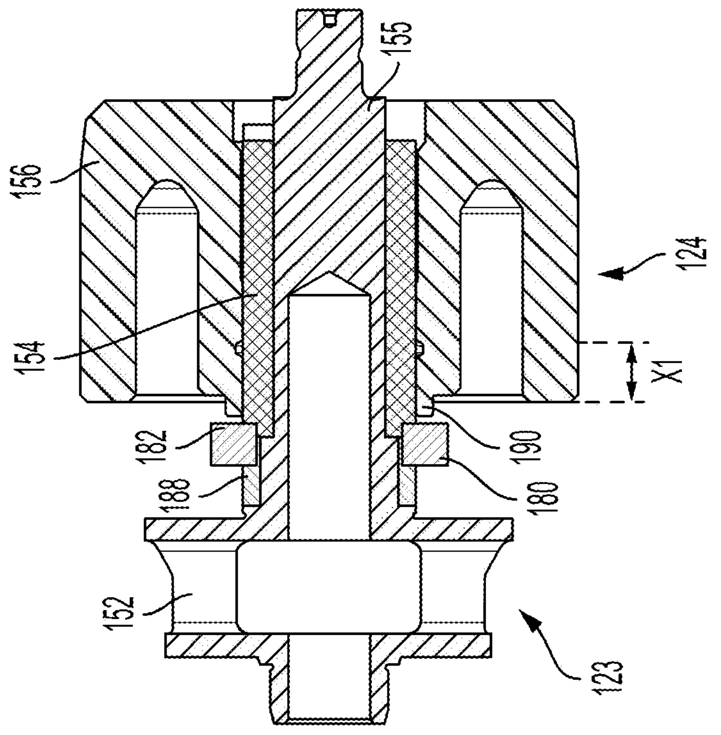
FIG. 7C is a side-cross sectional view of the transmission, coupler, and impact assembly of FIG. 7A with the hammer in a second position.

When torque on the tool output shaft is above the first threshold, the hammer 156 moves radially and axially along the cam shaft 154 and transmission output shaft 155 away from the anvil by a first distance X1 (e.g., between the positions shown in FIGS. 7A and 7C). Over the entirety of this travel distance X1, the coupler ring 180 engages both the external spline or recess 184 in the transmission output shaft 155 and the external spline or recess 186 in the cam shaft 154 so that torque is transmitted from the transmission output shaft 155 to the cam shaft 154. At the same time, the cam balls 172 travel in the cam groove 168 so that the hammer 156 applies intermittent rotary impacts to the anvil and to the tool output shaft.

When torque on the tool output shaft is above a second threshold (which is greater than the first threshold), the hammer 156 moves radially and axially along the cam shaft 154 and the transmission output shaft 155 away from the anvil by a second distance X2 that is greater than the first distance X1 (e.g., to the position shown in FIG. 7D). In this position, the rearward projection 190 on the hammer 156 pushes the coupler ring 180 axially rearward against the biasing force of spring 188. In this position, the spline or projection 182 engages only the spline or recess 184 in the transmission output shaft 155 but not the spline or recess 186 in the cam shaft, 154, which rotationally decouples the transmission output shaft 155 from the cam shaft 154. This interrupts torque transmission from the transmission output shaft 155 to the cam shaft 154, to the hammer 156, to the anvil and to the tool output shaft 26. Interrupting torque transmission also helps prevent the hammer 156 from moving further rearward and striking the planet carrier 152.

FIGS. 8A-8E illustrate another implementation of a rotary impact power tool 210 including a housing, a motor, a transmission 223, rotary impact assembly 124, and tool output shaft substantially similar to the housing 12, motor 20, transmission 23, impact assembly 24, and a tool output shaft 26 of the rotary impact power tool 10 described above, except for the differences discussed below. The transmission 223 includes a planet carrier 252 that carries planet gears (not shown) and a transmission output shaft 255 fixed to the planet carrier 252 so that they rotate together about the axis X upon rotation of the motor. The rotary impact assembly 224 includes a cam shaft 254 in the form of a cam ring received at least partially over the transmission output shaft 255 and axially retained on the transmission output shaft 255 by a flange 272 on the front end of the transmission output shaft 255. The impact assembly 224 further includes a generally cylindrical hammer 256 received over the cam shaft 254 and configured to move rotationally and axially relative to the cam shaft 254 to apply rotational impacts to the anvil (not shown). The impact assembly 224 also includes a pair of rear-facing V-shaped cam grooves 268 in the cam shaft 254, a corresponding pair of forward-facing V-shaped cam grooves (not shown) formed on an interior wall of the hammer 256, and a cam ball (not shown) received in and riding along the cam grooves to couple the hammer 256 to the cam shaft 254.

The transmission output shaft 255 and the cam shaft 254 are removably coupled to one another for common rotation by a coupler 275. The coupler 275 includes a clutch ring 280 received over the transmission output shaft 255 and includes internal features (e.g., splines) engaged with external features (e.g., splines) on the transmission output shaft 255 so that the clutch ring 280 rotates together with the transmission output shaft 255. The coupler 275 also includes clutch balls 282 received in recesses 284 in the rear end of the cam shaft 254 and in recesses 286 in the front end of the clutch ring 280. The clutch ring 280 is biased axially toward the cam shaft 254 by one or more clutch springs 288. In addition, the clutch ring 280 includes an annular rim 290 that is engageable by a rearward projection 292 on the hammer 256 when the hammer moves axially rearward along the cam shaft 254.

When the clutch balls 282 are engaged with the recesses 284, 286 in both the cam shaft 254 and the clutch ring 280, torque is transmitted from the cam shaft to the cam ring via the clutch ring and the cam ring transmits torque to the hammer. When the clutch balls 282 become disengaged from either the recesses 284 or the recesses 286, the transmission output shaft 255 is decoupled from the cam shaft

254, interrupting torque transmission from the transmission output shaft 255 to the cam shaft 254.

Figure 8B:
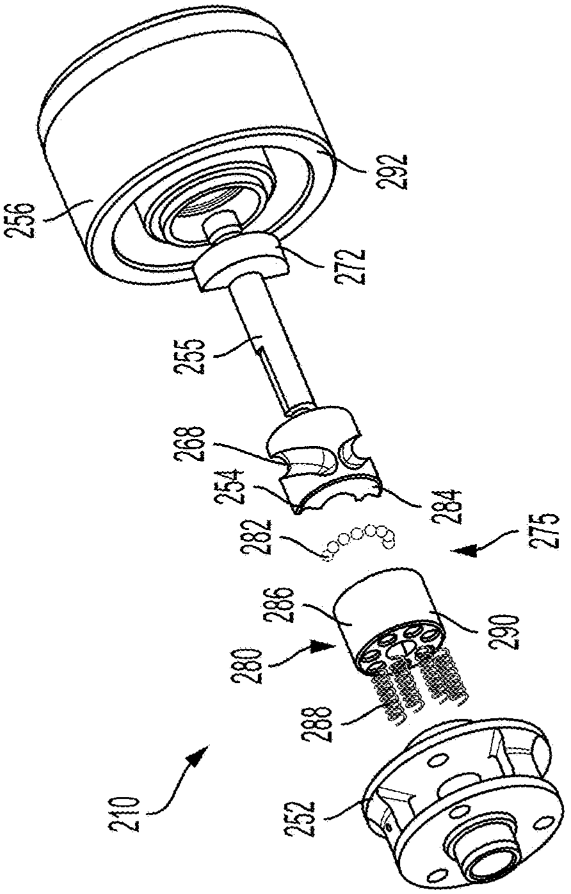
FIG. 8B is a partially transparent perspective view of the transmission, coupler, and impact assembly of FIG. 8A with the hammer in the first position.
Figure 8A:
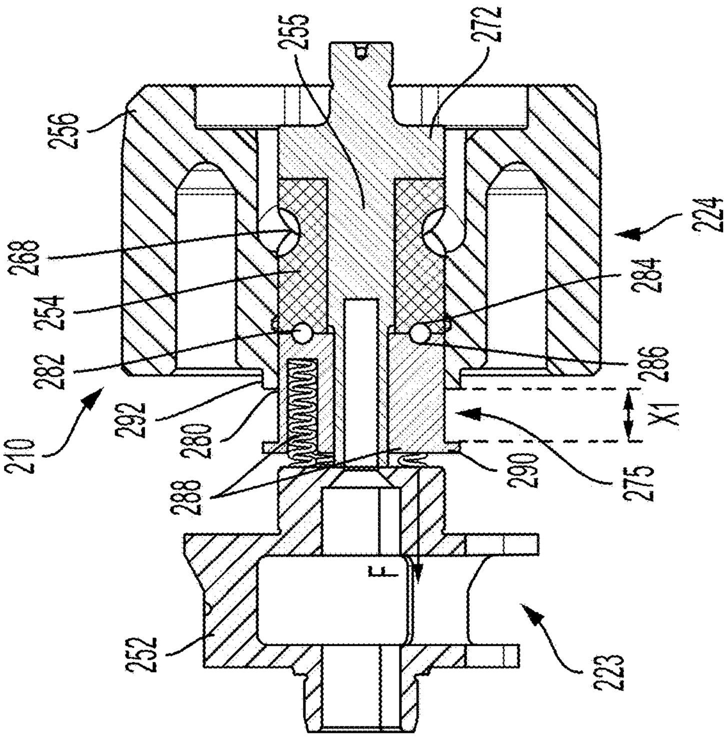
FIG. 8A is a side-cross sectional view of another implementation of a transmission, coupler, and impact assembly of an impact power tool, with the hammer in a first position.

In operation, when torque on the tool output shaft is less than a first threshold, the hammer 256 generally remains in a forward position (as shown in FIG. 8A) with the hammer projections continuously engaged with the anvil projections. At the same time, the clutch ring 280 is biased axially forward so that the clutch balls 290 engage the recesses 286 in the clutch ring 280 and the recesses in the cam shaft 254, so that torque is transmitted from the transmission output shaft 255 to the cam shaft 254. This causes the transmission output shaft 255, the cam shaft 254, the hammer 256, and the anvil to rotate continuously together to transmit torque to the tool output shaft without impacts.

Figure 8C:
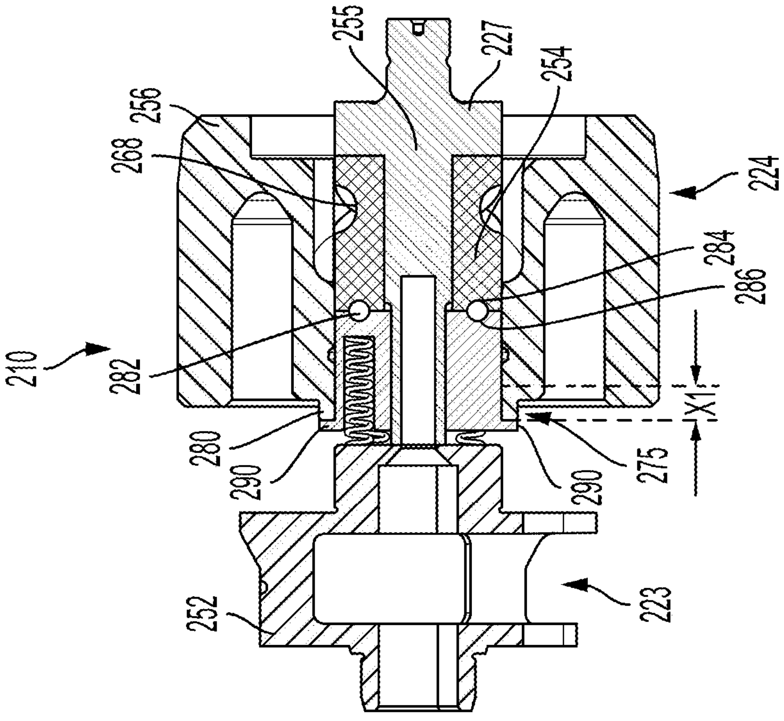
FIG. 8C is a side-cross sectional view of the transmission, coupler, and impact assembly of FIG. 7A with the hammer in a second position.

When torque on the tool output shaft is above the first threshold, the hammer 256 moves radially and axially along the cam shaft 254 and transmission output shaft 255 away from the anvil by a first distance X1 (e.g., between the positions shown in FIGS. 8A and 8C). Over the entirety of this travel distance X1, the clutch ring 280 is biased axially forward so that the clutch balls 290 engage the recesses 286 in the clutch ring 280 and the recesses in the cam shaft 254, and torque is transmitted from the transmission output shaft 255 to the cam shaft 254. At the same time, the cam balls travel in the cam grooves 268 so that the hammer 256 applies intermittent rotary impacts to the anvil and to the tool output shaft.

Figure 8E:
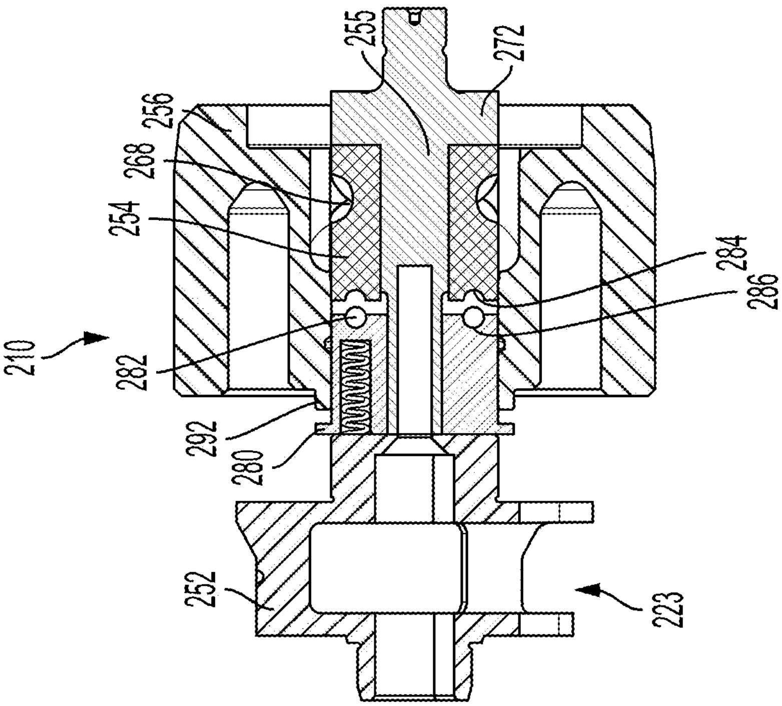
FIG. 8E is a side-cross sectional view of another implementation of a transmission, coupler, and impact assembly of an impact power tool.
Figure 8D:
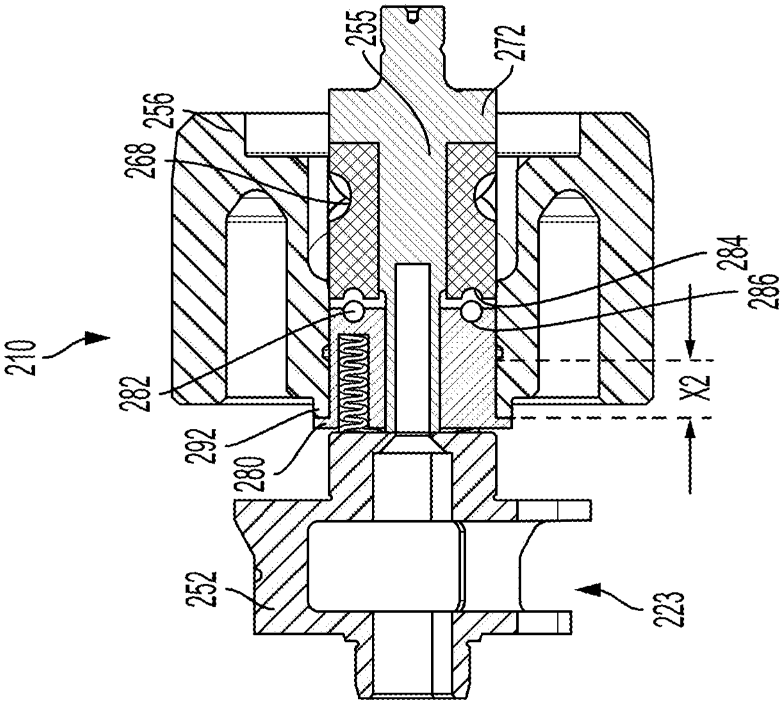
FIG. 8D is a side-cross sectional view of the transmission, coupler, and impact assembly of FIG. 7A with the hammer in a second position.

When torque on the tool output shaft is above a second threshold (which is greater than the first threshold), the hammer 256 moves radially and axially along the cam shaft 254 and the transmission output shaft 255 away from the anvil by a second distance X2 that is greater than the first distance X1 (e.g., to the position shown in FIG. 8D). In this position, the rearward projection 292 on the hammer 256 pushes the annular rim 290 on the clutch ring 280 axially rearward against the biasing force of spring 288. In this position, the clutch balls 282 engage only the recesses 286 in the clutch ring 280 but not the recesses 284 in the cam shaft 254, which rotationally decouples the transmission output shaft 255 from the cam shaft 254. This interrupts torque transmission from the transmission output shaft 255 to the cam shaft 254, to the hammer 256, to the anvil, and to the tool output shaft. Interrupting torque transmission also helps prevent the hammer 256 from moving further rearward and striking the planet carrier 252.

As shown in FIG. 8E, in an alternative implementation or under certain conditions of operation, the torque on the tool output shaft may cause the clutch ring 280 to move axially rearward against the force of the clutch springs 288 without the hammer projection 292 engaging the rim 290 on the clutch ring 280. If this occurs, the clutch balls disengage from the recesses 284 in the cam shaft 254, which rotationally decouples the transmission output shaft 255 from the cam shaft 254. This interrupts torque transmission from the transmission output shaft 255 to the cam shaft 254, to the hammer 256, to the anvil, and to the tool output shaft. Interrupting torque transmission also helps prevent the hammer 256 from moving further rearward and striking the planet carrier 252.

Example embodiments have been provided so that this disclosure will be thorough, and to fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Terms of degree such as "generally," "substantially," "approximately," and "about" may be used herein when describing the relative positions, sizes, dimensions, or values of various elements, components, regions, layers and/or sections. These terms mean that such relative positions, sizes, dimensions, or values are within the defined range or comparison (e.g., equal or close to equal) with sufficient precision as would be understood by one of ordinary skill in the art in the context of the various elements, components, regions, layers and/or sections being described.

Numerous modifications may be made to the exemplary implementations described above. These and other implementations are within the scope of this application.

What is claimed is:

1. An impact power tool comprising:

a housing;

a tool output shaft rotatable relative to the housing;

a motor received in the housing;

a transmission drivable by the motor and having a rotatable output member;

an impact assembly including a hammer configured to move axially and rotationally relative to the transmission output member, an anvil coupled to the tool output shaft, and a spring configured to bias the hammer toward the anvil, wherein the hammer is configured to transmit continuous rotational torque from the output member to the anvil when an output torque is less than a first torque threshold and to apply rotational impacts to the anvil when the output torque is greater than or equal to the first torque threshold, and wherein the impact assembly is configured to interrupt torque transmission from the output member to the hammer when the output torque is greater than or equal to a second torque threshold.

2. The impact power tool of claim 1, wherein the hammer is configured to move axially away from the anvil by up to a first distance when applying rotational impacts to the anvil.

3. The impact power tool of claim 2, wherein the hammer is configured to move axially away from the anvil by greater than the first distance when the output torque is greater than equal to a second torque threshold.

4. The impact power tool of claim 1, wherein the second torque threshold is greater than the first torque threshold.

5. The impact power tool of claim 1, further comprising a coupler disposed between the transmission output member and the hammer and configured to interrupt transmission of torque from the transmission output member to the hammer when the output torque is greater than or equal to the second torque threshold.

6. The impact power tool of claim 5, wherein the hammer includes a portion that is configured to cause the coupler to move from a coupled position to a decoupled position when the hammer moves axially by greater than a first distance.

7. The impact power tool of claim 1, wherein the coupler comprises a clutch movable between an engaged configuration to enable transmission of torque from the transmission to the hammer and the anvil and a disengaged configuration to interrupt transmission of torque from the transmission to the hammer and the anvil when a force on the clutch exceeds a threshold.

8. An impact power tool comprising:

a housing;

a tool output shaft rotatable relative to the housing;

a motor received in the housing;

a transmission drivable by the motor and having a rotatable output member;

an impact assembly including a hammer configured to move axially and rotationally relative to the transmission output member, an anvil coupled to the tool output shaft, and a spring configured to bias the hammer toward the anvil, wherein the hammer is configured to transmit continuous rotational torque from the output member to the anvil when an output torque is less than a first torque threshold and to apply rotational impacts to the anvil when the output torque is greater than or equal to the first torque threshold, and wherein the impact assembly is configured to interrupt torque transmission from the output member to the hammer when the hammer moves away from the anvil by a first distance between the hammer and the anvil or by greater than the first distance.

9. The impact power tool of claim 8, wherein the hammer is configured to move axially away from the anvil by less than the first distance when applying rotational impacts to the anvil.

10. The impact power tool of claim 9, wherein the hammer is configured to move axially away from the anvil by greater than the first distance when the output torque is greater than equal to a second torque threshold.

11. The impact power tool of claim 10, wherein the second torque threshold is greater than the first torque threshold.

12. The impact power tool of claim 8, further comprising a coupler disposed between the transmission output member and the hammer and configured to interrupt transmission of torque from the transmission output member to the hammer when the output torque is greater than or equal to the second torque threshold.

13. The impact power tool of claim 12, wherein the hammer includes a portion that is configured to cause the coupler to move from a coupled position to a decoupled position when the hammer moves axially by greater than a first distance.

14. The impact power tool of claim 13, wherein the coupler comprises a clutch movable between an engaged configuration to enable transmission of torque from the transmission to the hammer and the anvil and a disengaged configuration to interrupt transmission of torque from the transmission to the hammer and the anvil when a force on the clutch exceeds a threshold.

15. An impact power tool comprising:

a housing;

a tool output shaft rotatable relative to the housing;

a motor received in the housing;

a transmission drivable by the motor;

an impact assembly including a cam shaft or cam sleeve configured to be driven by an output of the transmission, a hammer configured to move axially and rotationally relative to the cam shaft or cam ring, an anvil coupled to the tool output shaft, and a spring configured to bias the hammer toward the anvil, wherein the hammer is configured to transmit continuous rotational torque to the anvil when an output torque is less than a first torque threshold and to apply rotational impacts to the anvil when the output torque is greater than or equal to the first torque threshold; and a clutch disposed between the transmission and the hammer, the clutch operable in an engaged configuration to enable transmission of torque from the transmission to the hammer and the anvil and operable in a disengaged configuration to interrupt transmission of torque from the transmission to the hammer and the anvil.

16. The impact power tool of claim 15, wherein the clutch the clutch disengages when a force on the clutch exceeds a threshold.

17. The impact power tool of claim 15, wherein the clutch comprises one or clutch balls configured to engage one or more recesses in a component of the impact assembly when the clutch is operable in the engaged configuration.

18. The impact power tool of claim 17, wherein the one or more balls are biased into engagement with the one or more recesses by one or more springs.

19. The impact power tool of claim 18, wherein the one or more balls are configured to disengage from the one or more recesses when the clutch is operable in the disengaged configuration.

20. The impact power tool of claim 15, wherein the clutch is disposed between the output of the transmission and the cam shaft or cam ring.

* * * * *